FIG. 1

INVENTORS
JOSEPH D. COCCOLI
JOHN R. LAWSON

INVENTORS:
JOSEPH D. COCCOLI
JOHN R. LAWSON

INVENTORS
JOSEPH D. COCCOLI
JOHN R. LAWSON

FIG. 5

INVENTORS:
JOSEPH D. COCCOLI
JOHN R. LAWSON

United States Patent Office 3,533,014
Patented Oct. 6, 1970

3,533,014
GAS RING LASER USING OSCILLATING RADIATION SCATTERING SOURCES WITHIN THE LASER CAVITY
Joseph D. Coccoli, Brighton, and John R. Lawson, Cambridge, Mass., assignors to Massachusetts Institute of Technology, Cambridge, Mass., a corporation of Massachusetts
Filed June 4, 1968, Ser. No. 734,407
Int. Cl. H01s 3/00; G01b 9/02
U.S. Cl. 331—94.5
18 Claims

ABSTRACT OF THE DISCLOSURE

Apparatus and method for improving the inertial angle sensing linearity of a gas ring laser of the type having two oppositely directed light waves. The improvement consists of mechanically oscillating at high frequency with optimum amplitude and phasing and in a preferred direction the radiation scattering sources within the laser, thereby minimizing the effects of induced light waves which occur in each of the modes of the oppositely directed waves when the laser is rotated. The resulting inertial drift rate obtainable from the ring laser is less than .001°/hr., thereby enabling the use of the gas ring laser as a highly accurate intertial angle measuring instrument, even at very low rotation rates.

---

The invention described herein was made in the performance of work under a National Aeronautics and Space Administration contract and is subject to the provisions of Section 305 of the National Aeronautics and Space Act of 1958, Public Law 85–568 (72 Stat. 435, 42 U.S.C. 2457).

BACKGROUND OF THE INVENTION

Field of the invention

This invention relates generally to gas ring lasers and particularly to apparatus and method for improving the inertial angle sensing linearity of such instruments.

Description of the prior art

Although they are relatively new instruments, the structure and many operational features of gas ring lasers are described in the literature. For example, many of the salient features of this type of instrument, when used as a gyroscope, are described by Philip J. Klas in an article entitled, "Laser Unit Challenges Conventional Gyros," which appears in Aviation Week and Space Technology, McGraw-Hill, vol. 85, No. 11, Sept. 12, 1966. A similar description is also given in an article entitled "News in Focus," which appears in Laser Focus, vol. 2, No. 19, October 1966.

Briefly stated, the gas ring laser comprises an optically resonant circuital cavity containing an amplifying gas that maintains two oppositely directed (i.e., contratraveling) beams of coherent light waves that travel over the identical circuital path. When the instrument is not rotating, the path lengths viewed by an observer in an inertial reference frame are equal and the waves have a common frequency. With rotation, however, the path lengths in inertial space traveled by the two waves to return to the same point in the ring laser cavity differ and the resonant optical frequencies of the contratraveling waves associated with a particular longitudinal mode of the ring laser cavity appear to be oppositely frequency shifted when viewed by an observer in the rotating frame of reference fixed to the ring laser cavity. The difference between the frequencies of the two waves, called the beat frequency, is a function of the rotational rate of the instrument. This geat frequency is measured by detecting the time-varying amplitude changes of the fringe pattern generated when the two waves are combined on an external optical detector. A fringe is adjusted in breadth to cover the entire surface of the detector.

Since this particular characteristic of the laser makes it especially suitable as a gyroscope or inertia angle measuring instrument, the preferred embodiment of subject invention will be described within the context of improving the linearity of the beat frequency response to rotation of the gas ring laser to enable its use for such application. It is emphasized, however, that subject invention is designed to improve the ring laser linearity in all circumstances where it is sensitive to inertial orientation whatever may be its particular application, and hence is not limited merely to its use as a gyroscope instrument.

Although there is a correlation between beat frequency and input rate over a board range, it is generally not a linear relation, particularly at low rates of rotation. Various optical scattering sources within the rotating laser, principally the mirrors and Brewster plates (if any), cause some of the light from each primary traveling wave to be scattered back in the path of the other primary wave which is traveling in the opposite direction. (The primary waves are defined as the waves that are identified with the ones that would be present in the absence of any backscattering and are also the only waves present in the limit of high rotation rates.) The scattered radiation is frequency shifted from the frequencies of the primary contratraveling waves by an amount proportional to the velocity of the scattering surface, i.e., proportional to the ring laser rotation rate. The scattered, frequency shifted waves, in turn, may induce large amplitude contratraveling optical waves at the backscattering frequencies, which in turn leads to frequency pulling of the primary waves, which is referred to in the literature as mode coupling. The ultimate result is that at low rates of rotation of the laser, the nonlinear dependence of beat frequency on rotation rate, caused by mode coupling, becomes very pronounced and when the rotation rate falls below a critical threshold value, usually in the order of ten earth rate units, there exists no beat frequency. Consequently, the effectiveness of the laser as an inertial angle measuring instrument at low rotation rates is severely curtailed.

The theoretical formation of the mode coupling mechanism has been the subject of several reports by various authors including C. C. Wang, Sperry Report No. AB–1272–0082–2 (December 1966); F. Aronowitz and R. J. Collins, Applied Physics Letters, vol. 9 (July 1, 1966); and J. DeLange, Applied Physics Letters, vol. 9 (Sept. 1, 1966). These formulations examine general coupling mechanisms requiring analysis by nonlinear differential equations. However, linearization and frequency domain techniques standard to linear system theory can be used to describe the special kind of coupling which is primarily responsible for the beat frequency characteristics of ring lasers. Such a description has been given by Dr. Cynthia Whitney of the Massachusetts Institute of Technology Instrumentation Laboratory in report E–2237, edited by Joseph D. Cocooli. Although, for purposes of the invention, it is immaterial whether the problem of mode coupling be described in terms of nonlinear differential equations or by lineariaztion and frequency domain techniques, the latter approach is considered to be more readily understandable. Hence, the explanations throughout will follow the frequency domain model. Such ex- invention itself. They are specifically related to a regular planations are included merely to aid in understanding the polygon shaped ring laser which is the more familiar instrument configuration. However, the physics generally apply to any configuration.

A single longitudinal mode of the ring laser is considered to be the only one with optical oscillation sustained by the excited laser gas. The electromagnetic energy in this mode is treated as a composite of forward and backward traveling waves, where forward traveling waves are defined as the waves propagating around the ring laser in the same direction as the physical rotation of the ring laser and backward traveling waves propagate around the ring laser in a direction opposite to that of the physical rotation of the ring laser. The original single longitudinal mode of oscillation is considered to consist of two modes, i.e., a forward wave mode and a backward wave mode, and henceforth the term "mode" will be used only in reference to these two directions of propagation of electromagnetic energy derived from the previously stated single longitudinal mode of oscillation. When the two modes are coupled by the scattering mechanism each mode supports two waves of slightly different frequencies, i.e., the aforementioned primary and induced waves.

Strictly speaking the model is not linear since signals at one frequency are multiplied by signals at another, but, this does not lead to any difficulty in formulating the frequency domain equations. The solutions of these frequency domain equations yield the four characteristic frequencies of the four waves comprising the primary and induced waves in the forward and backward modes, in the case of a regular polygon shaped ring laser.

In addition to the characteristic frequencies, the frequency domain equations provide the relative average complex amplitudes of the four waves as a function of the scattering strength, cavity bandwith and rotation of the ring laser. The wave frequencies and relative average amplitudes derived from the frequency domain equations are sufficient to predict accurately the ring laser beat frequency as a function of rotation rate. It is further predicted that below a certain critical rotation rate there exists no beat frequency, a condition which in fact is observed at and below rotation rates on the order of ten earth rate units. This critical effect occurs when the average magnitude of the amplitudes of the induced waves and primary waves are all equal. Then, the resultant electromagnetic field appears as a spatially periodic standing wave which is rotating at the same rate as the ring laser cavity when viewed by an observer in an inertial reference frame. Therefore, the spatially periodic standing wave appears fixed to the ring laser, and a detector fixed to the ring laser observes no phase variation of the standing wave and detects no beat frequency.

Consequently, despite the inherent advantages of the gas ring laser for use as an angle measuring instrument, such as the absence of mass-unbalance problems at high accelerations, minimum warm-up time, lower power requirements, compact packaging, and the like, it has not been competitive at low rotation rates with the more conventional electromechanical devices.

Some previous attempts have been made to overcome this problem. One approach has been to introduce a fixed bias into the instrument via a constant speed motor, Faraday bias cells, or Fresnel effect devices. The basic accuracy of this approach has been curtailed by the stability and frequency responses of the biasing means itself, and by the external magnetic fields generated by some of the biasing elements. Another approach has been to oscillate the whole laser through a very small angle at a low rate so as to obtain a continuously changing bias of known amplitude and frequency. The basic handicaps of this technique lie in the fact that during two intervals in each cycle of oscillation, the angular velocity (rotation rate) of the laser may fall below the natural lock-in threshold, during which no information on rotation can be obtained, and also the amplitude of oscillation must be held to extremely close tolerances because of the highly non-linear portion of the beat frequency curve that such devices must operate in. These various approaches and their disadvantages are described in detail in the literature and in copending application Ser. No. 626,198, now U.S. Pat. No. 3,469,922, by Joseph D. Coccoli and Dusan A. Koso. A third approach, constituting the invention claimed in the referenced copending application, is to rotate the gas ring laser at a constant inertial reference velocity, thereby establishing the laser as a reference relative to which rotation of a base or other object may be measured. Although this third approach provides the desired resolution, it requires additional components and is primarily intended for use in a gimbaled angular measuring unit.

SUMMARY

In view of the foregoing limitations in the use of the gas ring laser as an angle measuring device, it is a general object of the invention to provide an improved gas ring laser angle measuring apparatus having accuracies equal to or better than those supplied by the more conventional electromechanical devices.

It is another general object of the invention to provide an improved gas ring laser having an inertial drift rate less than .001°/hr., attributable to the above described mode coupling mechanism.

It is a still further object of the invention to provide an improved gas ring laser wherein the amplitude of the induced wave oscillations are effectively minimized and linearity is substantially improved.

It is a still further object of the invention to improve the operational characteristics of the gas ring laser with a minimum of components, cost, space, weight, and power consumption.

It is a still further object of the invention to improve the operational characteristics of the gas ring laser without inserting any additional object or objects into the instrument's optical channels.

It is a still further object of the invention to improve the operational characteristics of the gas ring laser without introducing a bias movement of the resonant optical path, or any movement of the resonant optical path that is not explicitly the rotation rate to be sensed.

These and other objects are met by a method of and apparatus for oscillating the various radiation scattering surfaces within the rotating ring laser in a preferred direction and at desired frequencies, amplitudes and relative phases. As aforementioned the primary sources of radiation scattering within the laser comprise the corner reflectors and Brewster plates (if present). The invention, however, is applicable to any other radiation scattering surfaces within the laser.

According to the invention, each radiation scattering surface is caused to oscillate mechanically upon excitation by a known power source. Each surface is so designed and mounted relative to its own plane and to that of the laser block that upon excitation thereof, it oscillates in a direction yielding the maximum frequency modulation of the scattered radiation, while introducing negligible frequency shift to the contratraveling primary waves.

As explained later in the specification, the scattering surfaces are oscillated at an amplitude and frequency chosen specifically to minimize the amplitude and number of induced waves that appreciably influence the frequency of the primary wave in each mode. An amplitude of oscillation is chosen such as to ensure that the frequency of the induced wave nearest to the primary wave in each code (direction) will differ in frequency therefrom by at least twice the frequency of mechanical surface oscillation. The optimum frequency of oscillation is chosen as high as practicable taking into consideration the properties of the materials comprising the surfaces and the characteristics of the excitation system. Oscillation of the surfaces at any frequency greater than zero distributes the energy in each mode among an infinite series of characteristic frequencies resolved into the primary wave and an infinite series of induced waves, each induced wave being separated from the next adjacent wave by the frequency of mechanical oscillation. Hence, the higher the frequency of surface oscillation, the greater the frequency separation between the induced waves and the less their effect on the primary wave.

An even further reduction in the effect of the remaining induced waves on the primary wave in each mode is achieved by establishing an optimum phase relationship among the oscillating surfaces.

Figure 2:
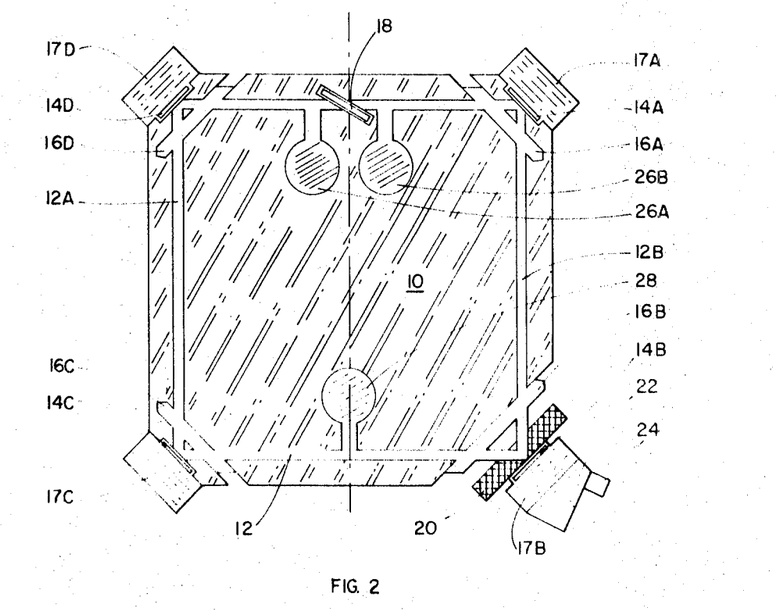
FIG. 2 is a cut-away top view of a typical gas ring laser used with the invention.

The specific values of frequency, amplitudes, and phase for each case depend on the design parameters and characteristics of the particular instrument. The ring laser used with the preferred embodiment of subject invention is shown in FIG. 2. The scattering surfaces, which comprise four mirrors and a Brewster plate located within the laser cavity, are of quartz crystal material acting as piezoelectrically driven shear mode oscillators. For this case, the maximum optimum frequency of oscillation is approximately one megacycle, at an optimum amplitude of about 0.16 micron for the mirrors and approximately 0.14 micron for the Brewster plate. Each mirror's phase of oscillation is 90 degrees ahead of the mirror preceding it, while the phase of oscillation of the Brewster plate is 45 degrees ahead of the mirror immediately prior thereto in the cavity. All of the scattering surfaces are coupled to a common oscillator, and amplification and phase shift is achieved using standard amplifiers and phase shifter components.

Further objects, features and advantages of the present invention and a better understanding thereof will become apparent with the following detailed description taken in conjunction with the accompanying drawings.

PREFERRED EMBODIMENT

Model description

A physical description of the effect on mode coupling of oscillating the scattering surfaces in the specified manner is given with reference to the frequency domain equations.

When the ring laser is rotating but the mirrors *are not* oscillated in the specified manner, two characteristic waves, identified as a primary wave and an induced wave, are present in each mode of the ring laser (i.e., forward wave mode and backward wave mode).

When the ring laser is rotating and the mirrors *are* oscillated in the specified manner, an infinite number of characteristic waves, resolved into a primary wave and an infinite series of induced waves, are present in each mode. The frequency spacing between successive characteristic induced waves is the frequency of mechanical oscillation of the mirror.

This series of induced waves and their frequency spacing can be explained for the following reasons. The instantaneous frequency shift occurring when a primary wave in one mode is back-scattered at the mirror surface into the opposite mode is proportional to the instantaneous velocity of the mirror. (This is a very accurate approximation so long as the mirror velocities are small compared to the speed of light, and the frequency shift will hereafter be referred to as a Doppler shift, even though the mirrors are in a nonintertial state of acceleration when the ring laser is rotating.) When the mirrors are oscillated, the Doppler shift frequency will therefore be varying or frequency modulated. It is well known in the art that a frequency modulated wave with sinusoidal modulation can be described in the frequency domain by an infinite series of waves separated in frequency by the modulation frequency. See Topics in Advanced Mathematics for Electronics Technology, Stephen Paull, section 608, page 214, John Wiley and Sons (1966).

The effectiveness in reducing mode coupling by distributing the energy of the backscattered wave among this series of characteristic frequencies is determined by the amplitude of the induced waves that result. The characteristic frequency of the aforementioned primary wave in a mode depends on two factors, the amplitudes of the induced waves and the frequency separation between the primary and induced waves. (The primary waves are important since the beat frequency is the frequency difference between the primary wave of the forward mode and the primary wave of the backward mode,, viewed in the rotating ring laser coordinate frame. Therefore, it is necessary to minimize the effect of the induced waves on the characteristic frequencies of the primary waves.) The mathematical treatment shows that the influence of an induced wave on the primary wave decreases with the square of their frequency separation, and that the amplitudes of the induced waves depend on several factors, to wit, the bandwith of the resonant laser cavity modes; the fraction of energy backscattered at the scattering surfaces; the ratio of the wavelength of the optical wave to the amplitude of mechanical oscillation; and the phase relationship among the mechanical oscillations of the different scattering surfaces.

The bandwidth of the cavity's modes and the fraction of energy backscattered at the scattering surfaces can be controlled to within a reasonable degree by good design techniques The frequency, amplitude, and relative phase of surface oscillation is controlled as follows.

According to the invention, the optimum amplitude $A_{mi}$ of mechanical oscillation for the $i$th numbered of $n$ total surfaces is chosen such as to ensure that the optical frequency of the induced wave nearest the primary wave in each mode differs from the optical frequency of that primary wave by a frequency corresponding to at least twice the frequency of mechanical oscillation of the surface.

The optimum amplitude $A_{mi}$ is defined as:

$$A_{mi} = \frac{\beta \lambda}{4\pi (\sin \alpha_i)} (i=1, 2, 3 \ldots n) \qquad (1)$$

where $\alpha_i$ is the angle of incidence of the primary waves at the $i$th scattering surface, $\lambda$ is the wavelength of the primary waves, and $\beta$ is any number which, taken as the argument of the Bessel function of zero order, yields a values of the Bessel function that is zero.

The optimum amplitude of oscillation can be explained to exist for the following simple argument. Assume there were two identical sets of scattering surfaces displaced by one quarter wavelength along the optical path of the primary wave. Then the net backscattered wave would produce two identical backscattered waves 180° out of phase that would mutually cancel. Now, the actual process of oscillating the single scattering surface with a component of displacement along the optical path sets up a number of backscattered waves which interfere with each other when the oscillation amplitude is of the order of a quarter wavelength or any odd multiple, because by the nature of sinusoidal oscillation the most probable displacements are at the maximum points of displacement. The zero order Bessel function that occurs in the mathematical treatment more accurately describes the fact that the scattering surfaces are not only found at the two points of maximum displacemen, but also with lesser probability everywhere in between.

When the oscillation amplitude is chosen such that the zero order Bessel function *does not* vanish, the closest induced wave to the primary wave is within a rotation-rate produced Doppler-shifted optical frequency interval from the primary wave.

However, when the zero order Bessel function *is made equal to zero*, the nearest induced wave to the primary wave is found at an optical frequency corresponding to approximately twice the mechanical oscillation frequency from the primary wave.

In addition to determining the optimum amplitude from Equation 1, a choice is made of the optimum frequency of mechanical oscillation $f_{mi}$, where, as before, the subscript $i$ represents any given scattering surface. As aforementioned, oscillation of the surfaces at any frequency greater than zero distributes the energy of the backscattered waves among an infinite series of discrete frequencies. Further, the larger the value of $f_{mi}$, the greater the optical frequency separation between each induced wave and hence the greater the reduction in the number of induced waves that appreciably influence the optical frequency of the conta-traveling primary waves. However, optimization of the operating frequency of mechanical oscillation must also take into account the peculiar physical properties of the material(s) comprising the surfaces and the characteristics of the system employed to drive these surfaces. The optimum $f_{mi}$, therefore, is chosen as large as possible with these aforementioned constraints.

Thus, the choice of an oscillation amplitude that makes the zero order Bessel function vanish, combined with choice of a high mechaical oscillation frequency, very strongly reduces the influence of the closest induced wave on the primary wave and eliminates for all practical purposes the influence of all more distantly located induced waves.

Finally, oscillating each of the separate scattering surfaces that exist in the ring laser with the proper choice of relative phase greatly reduces the amplitudes of the induced waves. The optimum phase $\phi_{mi}$ of oscillation for the $i$th numbered of $n$ total surfaces is specified as:

$$\phi_{mi} = \theta_{mi} + \Psi \quad (2)$$

where $\Psi$ is the reference phase, which is constant, and where $\theta_{mi}$, the phase angle for the $i$th surface relative to $\Psi$, is determined from:

$$\theta_{mi} = 2\pi r_{mi}/l \quad (i=1, 2, 3 \ldots n) \quad (3)$$

where $2\pi$ is the circumferance of the circle of unit radius, $l_{mi}$ is the position of the $i$th surface along the optical path, and $l$ is the total length of the optical path within the ring laser. (As is known in the art, a polygonal ring laser can be treated as an equivalent circular ring laser.)

Consider, for example, a ring laser with four scattering surface equally spaced around the ring laser optical path. The aforementioned phase relation then states that each successive surface should be 90 degrees ahead in phase of oscillation of the previous surface. At each instant of time each scattering surface is contributing to a backscattered wave with a different instantaneous frequency shift. Thus, by the proper phasing, mutual reinforcement of the backscattered wave is minimized. (If, on the other hand, the surfaces were oscillated in phase relative to each other, the contribution from any one surface to the amplitude of each of the induced waves would add to the contribution from each of the other mirrors.)

Figure 1:
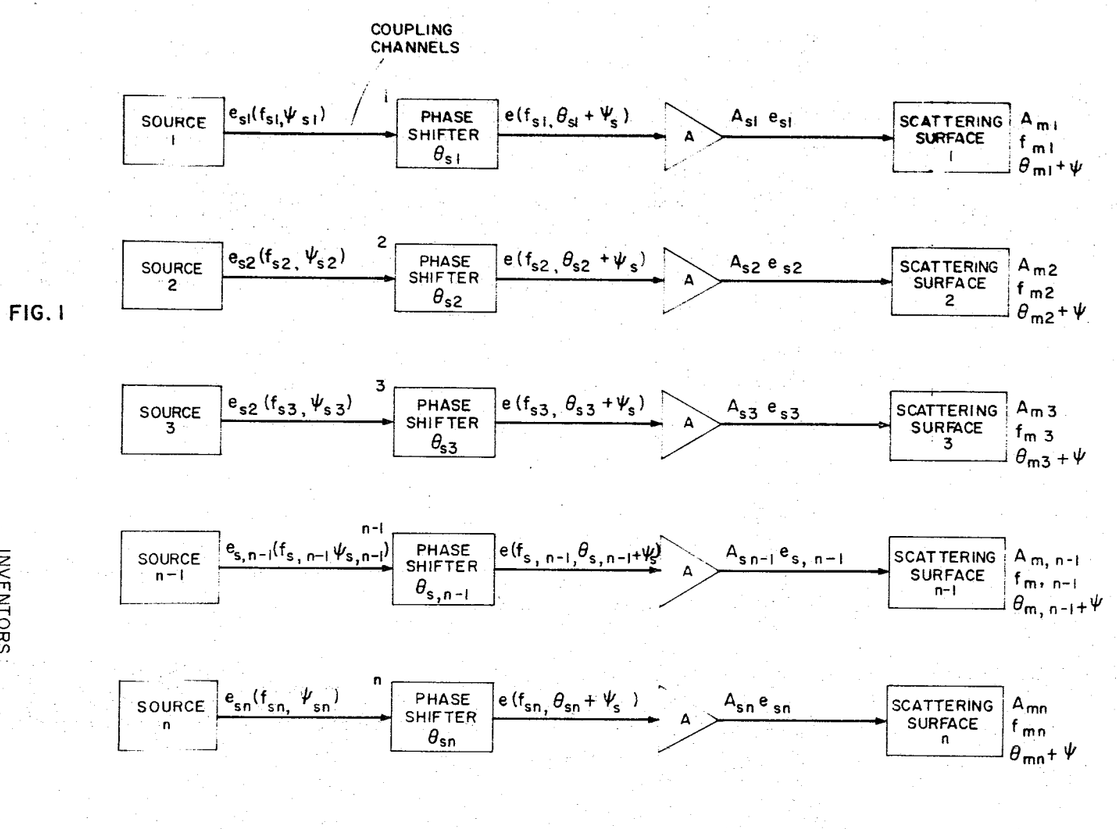
FIG. 1 is a generalized block diagram of the invention, showing functionally the relation of the excitation circuitry to the laser surface.

A generalized concept of the apparatus used to implement the invention is shown in the block diagram of FIG. 1 for the case of $n$ scattering surfaces, where $n$ represents any number. As noted therein, each of surfaces $1$ through $n$ is coupled to a sinusoidal signal source via a correspondingly numbered channel, each channel comprising a phase shifter and an amplifier. The frequency, phase and amplitude of the signal in each channel as applied to each surface is such as to cause that particular surface to oscillate at the desired frequency, relative phase, and amplitude determined as aforementioned. Each surface, in turn, is located within the laser's resonant optical path and is formed and mounted for oscillation in a shear mode and in a direction parallel to the laser's plane (the laser's plane being defined as the plane of the optical path). The mode and direction of oscillation imparts a maximum frequency modulation to the backscattered and hence induced waves while imparting eligible frequency modulation to the contratraveling primary waves.

Consider for example the $i$th surface, where $i$ represents a distinct integer ranging from $l$ to $n$. Signal $e_i$ of frequency $f_{si}$ and phase $\psi_{si}$ is generated by the appropriate sinusoidal signal source and shifted in phase by angle $\theta_{si}$ relative to a reference phase $\psi_s$. The reference phase is determined as follows: oscillation of one of the surfaces is determined as the reference phase relative to which the other surfaces will be oscillated. Hence, the phase of that oscillating surface is designated as $\psi$, and the phase of the signal in the correspondingly numbered channel is designated as reference phase $\psi_s$. The value of $\theta_{si}$ will then be chosen to correspond to the optimum $\theta_{mi}$ from Equation 3. The phase shifted signal is amplified to an amplitude $A_{si}$ corresponding to the optimum $A_{mi}$ from Equation 1.

Although $n$ sources are shown in FIG. 1, the preferred embodiment (see FIG. 5) employs a common oscillator and frequency, indicating that the invention is not per se limited to any particular excitation apparatus.

Description of the invention

The particular gas ring laser configuration used in conjunction with the preferred embodiment of subject invention is shown in FIG. 2. As noted therein, laser 10 is machined from a rectangular block of transparent solid fused quartz. Internal to the block is resonant cavity or channel 12 running parallel to the sides of the block, and comprising symmetrically disposed discharge arms 12A and 12B which by design form a closed optical path. Discharge arm 12A corresponds to the shorter path of channel 12 connecting cathode 28 and anode 26A; while discharge arm 12B corresponds to the shorter path of channel 12 connecting cathode 28 and anode 26B. Dielectric film mirrors 14A through 14D are mounted via mounting plates 17A through 17D, respectively, at each corner thereto. The length of channel 12 is designed such as to support only a single longitudinal optical mode of a twin neon isotope helium-neon ring laser. For the laser used in the preferred embodiment, channel 12 is 25 to 30 centimeters long and has a diameter of one to two millimeters. Channel 12 is filled with a helium-neon mixture in the approximate ratio 5:1 at a total pressure of approximately three torr. The mixture comprises isotope helium-3 and optimum amounts of isotopes neon-20 and neon-22. The neon isotopes are the lasing or active isotopes and the optimum concentration ratio of neon-20 to neon-22 is approximately 27/23. Bypasses 16A through 16D for gas discharge current are provided adjacent to each mirror, and large ballast reservoirs (not shown) are provided to minimize pressure changes due to discharge clean up processes and outgassing. Further, Brewster plate 18 may be used in channel 12 to eliminate any induced circulation flow of the laser gas.

At one corner of channel 12 is located piezoelectric transducer 20, combining optics 22 and photocell detector 24.

The laser gaseous medium is excited by the application of DC voltages between the anodes 26A and 26B and the cathode 28, producing a laser amplifying gas that in conjunction with the resonant optical channel generates and supports two contratraveling light waves within channel 12. A small portion of the light from each of the two contratraveling light waves incident on mirror 14B (adjacent to combining optics 22) is allowed to pass through the mirror to the combining optics. The two waves are combined so as to be nearly parallel. A wave front interference is thus produced, which, in turn, generates a fringe pattern of light and dark bars that move past detector 24. The detector dimensions are less than the fringe spacing. Thus, the rate at which the fringe pattern phases detector 24 is the laser beat frequency output.

As aforementioned, the surface of mirrors 14A through 14D and Brewster plate 18 (if used) are the principal sources of radiation scattering, causing the induced waves and the mode coupling previously described. In the preferred embodiment, the mirrors and Brewster plate are AT-cut piezoelectric quartz crystals, 25 millimeters in diameter and 1.1 millimeters thick.

Figure 3:
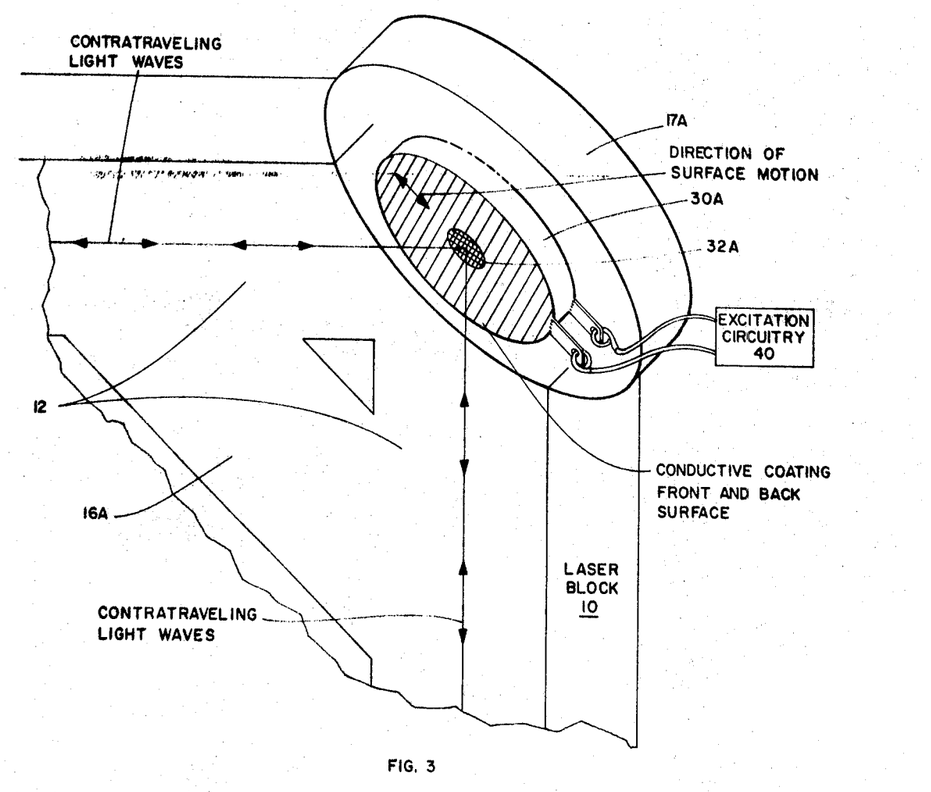
FIG. 3 is an expanded perspective view of one of the laser's mirrors, showing the components thereof with relation to the excitation circuitry of FIG. 5.

The apparatus used to implement the invention relative to the corner mirrors is shown in FIG. 3 which is an expanded view of mirror 14A. Mirror 14A is used as an example, and the following discussion applies equally to all of the other mirrors in the instrument. As noted in the figure, mirror 14A comprises a piezoelectric quartz crystal substrate 30A, coupled to the excitation circuitry 40, and a dieletcric film surface 32A coupled to substrate 30A and acting to reflect the contratraveling light waves within channel 12. Mirror 14A is mounted via substrate 30A to mounting plate 17A which, in turn, is rigidly affixed to laser block 10. Except for the area comprising film surface 32A, substrate 30A is coated on its front end and (parallel) back surface with a conductive material such that activation thereof by excitation circuitry 40, and a dielectric film surface 32A the crystal, thereby activating its piezoelectric properties. Further, substrate 30A is crystallographically cut such that any oscillation thereof is in the shear mode, i.e., parallel to the plane of the optical surface, and it is mounted relative to the laser such that it also oscillates parallel ot the laser plane. (The "laser plane" is defined as the plane in which lies the laser's resonant optical path.)

In the preferred embodiment, for increased power efficiency, though not essential to the invention, substrate 30A is coupled at its approximate nodal surface to laser mounting plate 17A. (The term "nodal surface" is defined to mean the loci of all contiguous points of zero amplitude of oscillation; the "antinodal surface" is defined as the loci of all contiguous points of maximum amplitude of oscillation.) Also, for increased efficiency, mounting plate 17A is acoustically mismatched, thereby reducing the energy loss to the plate and requiring less power dissipation in mirror 14A. The crystal thickness of substrate 30A is chosen to be approximately a quarter wavelength of the quartz acoustic shear wave generated at the oscillation frequency. However, the actual driver oscillation frequency of excitation circuitry 40 is chosen several bandwidths away from the mirror resonance in order to decrease the effect of oscillator frequency detuning drift on amplitude stability.

In accordance with the teachings of the electro-optical arts, the aforementioned crystallographic formation of substrate 30A and the specified mounting thereof insures that upon excitation, substrate 30A, and hence film surface 32A, oscillates parallel to the plane of the laser (thereby imparting the frequency modulation to the scattered radiation), and also oscillates parallel to the plane of its own optically coated surface (thereby imparting negligible Doppler shift to the contratraveling light waves).

Figure 3A:
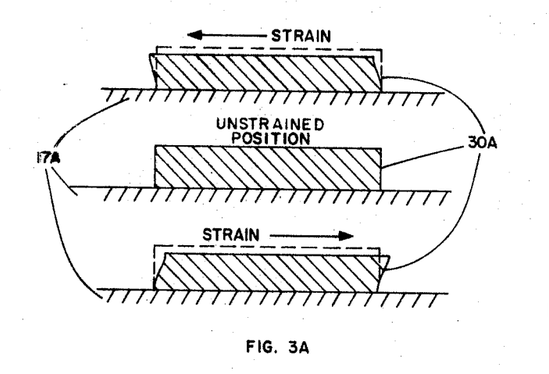
FIG. 3A is a cross section view of the mirror's piezoelectric quartz crystal substrate, showing direction of oscillation.

The shear deformation undergone by quartz substrate 30A upon excitation thereof is depicted in FIG. 3A.

Figure 4:
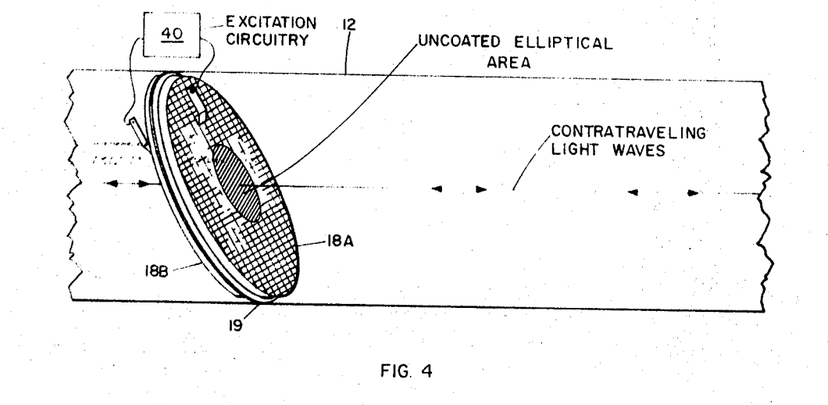
FIG. 4 is a cutaway view of the piezoelectric quartz Brewster plate, showing the components with relation to the excitation circuitry of FIG. 5.

The apparatus used to implement the invention relative to Brewster plate 18 (if used) in the path of channel 12 is shown in the diagram of FIG. 4. As noted therein, plate 18 comprises piezoelectric quartz substrate 18A and 18B, supported at the midplane section by support web 19 coupled to the walls of channel 12. The surfaces of substrates 18A and 18B are coated with a conductive material and are also coupled to excitation circuitry 40. An uncoated elliptical section of the two surfaces allows nearly unattenuated passage through the Brewster plate of the contratraveling waves within channel 12.

Figure 4A:
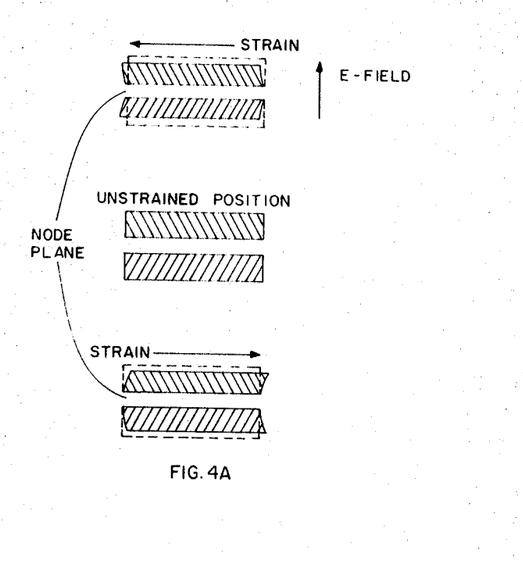
FIG. 4A is a cross section view of the piezoelectric Brewster plate, showing direction of oscillation.

As in the case of the mirrors, plate 18 is formed in a specified crystallographic orientation for vibrations in a shear mode. (Substrate surfaces 18A and 18B are the nodal surfaces and support web 19 contains the antinodal plane of the shear mode oscillation.) Consequently, as in the case of the mirrors, the application of power via excitation circuitry 40 causes substrate surfaces 18A and 18B to oscillate parallel to the plane of laser 10 (thereby imparting a Doppler shift to the scattered radiation), and parallel to the planes of their own surfaces (thereby imparting negligible Doppler shift to the primary contratraveling light waves). Again, the quartz substrates also serve as the oscillators in an otherwise typical crystal shear mode driven oscillator. The resulting positions assumed by quartz substrates 18A and 18B during oscillation are depicted in FIG. 4A.

For the laser depicted in FIG. 2, the angle of incidence $\alpha_1$ of the primary waves on each of the mirrors is 45 degrees and on the Brewster plate is 55 degrees, the wavelength $\lambda$ of the primary waves is 6328 angstroms, and $\beta$ is chosen to be 2.424 as the lowest of a number of possible values, which, taken as the argument of the Bessel function of zero order, yields a value of the Bessel function that is zero. Substituting into Equation 1, the optimum amplitude $A_{m1}$ of mechanical oscillation is found to be approximately 0.16 micron for each of the mirrors and approximately 0.14 micron for the Brewster plate.

As aforementioned, in optimizing $f_{mi}$ a tradeoff must be made between the goal of obtaining as large a frequency as possible versus other design goals imposed by the properties of the material and its excitation system. In the preferred embodiment, the optimum $f_{mi}$ is chosen relatively near, but not to exceed, the resonant frequency of the mirrors and plate in order that the power dissipated does not exceed tolerable temperature limits. For an AT-cut quartz crystal 1.1 millimeters thick, resonant oscillation of the shear mode occurs at approximately 1.5 megacycles. (For a tabular listing of the constants of some typical quartz resonators, including the characteristics of the AT-cut type, see Piezoelectricity, by Walter Cady, vol. 2, page 461, Dover Publications, 1964.) In order to decrease the effect of oscillator frequency detuning drift on amplitude stability, the optimum $f_{mi}$ is chosen within a few bandwidths below the crystal's aforementioned resonance. In the preferred embodiment, the mirrors and Brewster plate are all oscillated at the same frequency, approximately one megacycle. Further, the frequency of mechanical oscillation is substantially identical to the frequency of the signal produced by the common oscillator.

For the laser of FIG. 2 where the mirrors are spaced at equal intervals within the channel and Brewster plate 18 is equidistant from mirrors 14D and 14A, the optimum phase relationship is determined from Equations 2 and 3 as follows:

$$\phi_{14A} = 2\pi(0)/l + \Psi = \Psi \text{ radians} => \Psi°$$

$$\phi_{14B} = 2\pi\left(\frac{l}{4}\right)/l + \Psi = \frac{\pi}{2} + \Psi \text{ radians} => 90° + \Psi°$$

$$\phi_{14C} = 2\pi\left(\frac{l}{2}\right)/l + \Psi = \pi + \Psi \text{ radians} => 180° + \Psi° \quad (4)$$

$$\phi_{14D} = 2\pi\left(\frac{3l}{4}\right)/l + \Psi = \frac{3\pi}{2} + \Psi \text{ radians} => 270° + \Psi°$$

$$\phi_{18} = 2\pi\left(\frac{7l}{8}\right)/l + \Psi = \frac{7\pi}{4} + \Psi \text{ radians} => 315° + \Psi°$$

where the subscripts for $\phi$ correspond to the numbering of the mirrors and Brewster plate in FIG. 2.

Figure 5:
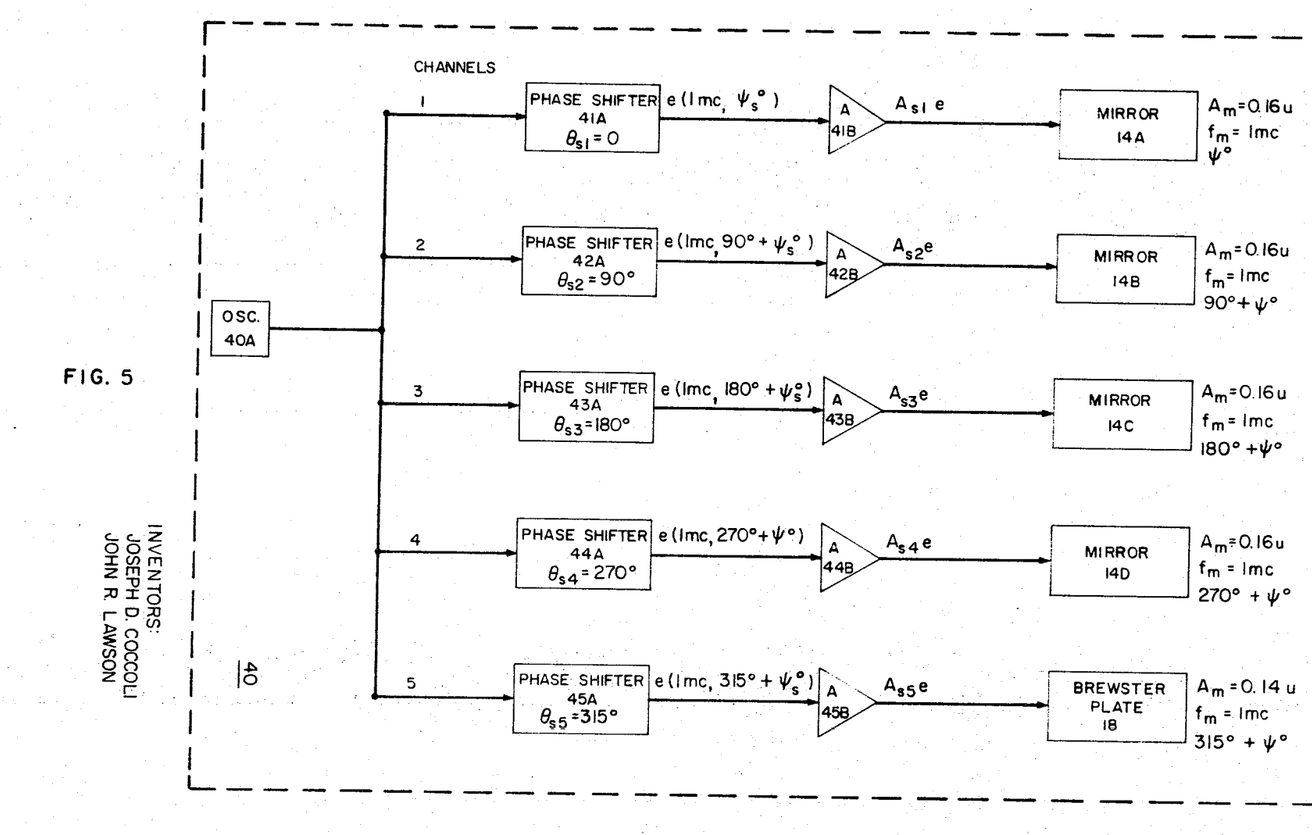
FIG. 5 is a block diagram of the excitation circuitry of subject invention used with the laser of FIG. 2.

Excitation circuitry 40 is shown in the block diagram of FIG. 5. As noted therein, oscillator 40A is coupled via parallel channels 1 through 4 to mirrors 14A through 14D, respectively, and via parallel channel 5 to Brewster plate 18. Each channel, in turn, comprises a phase shifter and amplifier. A signal having a frequency of approximately one megacycle and reference phase $\psi_s$ is generated by oscillator 40A to each of the channels. The signal in each channel is shifted in phase relative to $\psi_s$ (by phase shifters 41A through 45A for channels 1 through 5, respectively) by an angle appropriate to establish the relationship of equation set (4). Amplifiers 41B through 44B in channels 1 through 4, respectively, amplify the phase shifted signal to an amplitude sufficient to set the amplitude of oscillation of each of mirrors 14A through 14D at approximately 0.16 micron. The phase shifted signal in channel 5 is amplified by amplifier 45B to an amplitude corresponding to an amplitude of oscillation of Brewster plate 18 of approximately 0.14 micron. (For increased accuracy and efficiency, the amplitude stability in the outputs of the oscillator, individual phase shifters, and individual amplifiers is regulated at approximately 0.01 percent.)

As aforementioned, oscillating the scattering surfaces in this optimum manner eliminates any appreciable component of the induced wave at a frequency which is separated from the primary wave by the rotation rate Doppler shift at backscattering, identified here as the principal induced wave, and considerably reduces the amplitude of the next closest wave, which is frequency separated from the primary wave by twice the oscillation frequency, in this preferred embodiment, by approximately two megacycles. The degree to which the principal induced wave is eliminated is related to the amplitude stability of the scattering surfaces being oscillated, which, in turn, is related to the amplitude stability of the electronic circuitry described. The range of allowable amplitude variations is found from a calculation of the range of values of the zero order Bessel function which result from the amplitude variations. As aforementioned, the ideal situation is to adjust the crystal oscillation amplitudes so that the zero order Bessel function has zero value, and practical considerations of how much variation from zero can be tolerated dictate the previously noted amplitude stability.

For the reasons previously described, the maximum Doppler shift in the scattered light is as much as a few megacycles from the optical frequencies of the traveling light beam in its direction. Here again, due to the direction of motion, no Doppler shift is imparted to the primary traveling wave sustained laser oscillations.

Although a specific rectangular quartz laser configuration has been described, it is apparent that subject invention is applicable to any gas filled ring laser having an arbitrary closed optical path, producing a beat frequency in response to rotation of the laser, and having internal thereto sources of radiation scattering. The particular configuration described herein was chosen because of its excellent design features which help to minimize the various error producing environmental factors that act on a laser. Further, although the preferred embodiment of subject invention relates to the mirrors and Brewster plate (when used) since these serve as the primary sources of radiation scattering, it is applicable with little or no modifications to any radiation scattering surfaces within the laser. For example, the mirrors may constitute some other type of reflector. The oscillation technique need not be limited to a piezoelectric effect, but is meant to include any electromechanical vibration drives depending on the material comprising the surfaces to be oscillated.

As mentioned previously, subject invention is designed to improve the ring laser linearity in all circumstances where it is sensitive to inertial orientation and is not meant to be limited merely to its use as a gyroscopic instrument.

It is noted that any use of the ring laser as a measuring device dependent on beat frequency output over extended periods of time requires the control of other error sources in addition to the minimization of mode coupling. Some of these environmental factors, such as temperature distortion of the optical cavity, axis wobble, dust atmospheric density, and the like, are effectively eliminated by good design techniques known in the art. The beat frequency is also a function of the signal pass gain in which the laser is operated, and of the balancing of the DC discharge currents in the discharge arms of the laser channel. Stabilization of these phenomena is therefore necessary. The means for effecting such stabilization are described and claimed in copending application Ser. No. 626,198, now U.S. Pat. No. 3,469,922 by Joseph D. Coccoli and Dusan A. Koso, and are not meant to be the subject of the present application.

What is claimed is:

1. In combination with a rotatable ring laser of the type wherein are included a gas-filled discharge channel forming a closed resonant optical path lying in a plane, designated as the laser plane, wherein excitation of said laser gas generates within said channel two contra-traveling primary light waves of identical optical frequency and wavelength, and wherein rotation of said laser generates a difference frequency between said contra-traveling primary light waves relative to said laser, said laser further including a plurality $n$ of numbered surfaces, each numbered by a distinct integer $i$, which ranges serially from $l$ to $n$, on which said contratraveling primary light waves impinge, said surfaces so formed and mounted within said channel such that the application of a sinusoidal signal to said surfaces causes said surfaces to oscillate in a shear mode parallel to said laser plane, each of said surfaces having imperfections which cause fractions of the radiation of each of said primary light waves incident on said surfaces to be backscattered into the path of the other of said primary light waves, said fractions of backscattered radiation being mutually reinforcing in the same direction, thereby producing within said channel two contratraveling induced light waves, each of which acts to change the frequency of said primary light wave traveling in its direction, causing mode coupling between said primary waves, the improvement which comprises in combination, (a) a plurality $n$ of numbered signal sources each of said sources likewise numbered by said integer $i$, the $i$th of said sources generating a sinusodial output signal $e_i$ having a frequency $f_{si}$ and a phase $\psi_{si}$;

(b) a plurality $n$ of coupling means, each of said coupling means likewise numbered by said integer $i$, the $i$th of said coupling means intercoupling the $i$th of said signal sources with the $i$th of said surfaces; and (c) whereby said signal $e_i$ from the $i$th of said sources causes the $i$th of said surfaces to oscillate mechanically at a frequency $f_{mi}$, thereby distributing the energy of said two contratraveling induced waves among a plurality of secondary induced waves in both directions, each of said secondary induced waves differing in optical frequency from the next ajacent secondary induced wave by an optical frequency corresponding to said frequency $f_{mi}$, thereby reducing, in direct proportion to the value of said $f_{mi}$, the influenece of said induced waves on said optical frequency of said contratraveling primary waves.

2. The improvement of claim 1 wherein the $i$th of said coupling means comprises an amplifier for amplifying said signal $e_i$ to an amplitude $A_{si}$ which causes the $i$th of said surfaces to oscillate at an amplitude $A_{mi}$, said $A_{mi}$ being specified such as to cause, in each direction, the optical frequency of the nearest of said secondary induced waves to said corresponding primary wave to differ from that of said corresponding primary wave by an optical frequency corresponding to a minimum of $2f_{mi}$.

3. The improvement of claim 2 wherein said amplitude $A_{mi}$ is specified by the equation $$A_{mi} = \beta\lambda/4\pi(\sin \alpha_i)$$

wherein $\alpha_i$ is the angle of incidence of the primary waves at the $i$th of said surfaces, $\lambda$ is the wavelength of said primary waves, and $\beta$ is any number which, taken as the argument of the Bessel function of zero order, yields a value of the Bessel function that is zero.

4. The improvement of claim 3 wherein the $i$th of said coupling means further comprises a phase shifter for shifting said phase $\psi_{si}$, of said signal $e_i$ by an angle $\theta_{si}$ relative to a reference phase $\psi_s$, said $\psi_s$ being the phase of one of said signals $e_i$, such that the $i$th of said surfaces oscillates at a phase angle $\theta_{mi}$ relative to a reference phase $\psi$ corresponding to said reference phase $\psi_s$, said angle $\theta_{mi}$ being so specified as to minimize said mutual reinforcement of said fractions of back-scattered radiation.

5. The improvement of claim 4 wherein said phase angle $\theta_{mi}$ is specified by the relationship.

$$\theta_{mi} = 2\pi l_{mi}/l$$

wherein $l_{mi}$ is the relative position of the $i$th of said surfaces along said path of said laser, and $l$ is the total length of said laser's path.

6. The improvement of claim 1 wherein said frequency $f_{mi}$ is optimized as large as possible consistent with predetermined design goals.

7. The improvement of claim 6 wherein said frequency $f_{mi}$ is optimized at substantially the resonant frequency of said $i$th surface.

8. The improvement of claim 5 wherein each of said surfaces comprises a piezoelectric quartz crystal.

9. The improvement of claim 8 wherein said frequency $f_{mi}$ is optimized at approximately one megacycle, said $\beta$ equals approximately 2.424, and said $\lambda$ equals 6328 angstroms.

10. The improvement of claim 9 wherein said surfaces comprise at least three reflectors positioned at equal intervals along said laser's path.

11. The improvement of claim 10 wherein each of said reflectors comprises a dielectric film mirror and wherein said $\alpha_i$ at each of said mirrors equals 45 degrees, thereby specifying said $A_{mi}$ as approximately 0.16 micron for each of said mirrors.

12. The improvement of claim 10 wherein said surfaces further comprise a Brewster plate positioned along said laser's path equidistant from two of said reflectors and wherein said $\alpha_i$ at said plate equals 55 degrees, thereby specifying said $A_{mi}$ as approximately 0.14 micron for said plate.

13. The improvement of claim 1 wherein said plurality $n$ of numbered signal sources comprises one common oscillator.

14. A method of improving the inertial angle sensing linearity of a rotatable ring laser of the type wherein are included a gas-filled discharge channel forming a closed resonant optical path lying in a plane, designated as the laser plane, wherein excitation of said laser gas generates within said channel two contratraveling primary light waves of identical optical frequency and wavelength, and wherein rotation of said laser generates a difference frequency between said contratraveling primary light waves relative to said laser, said laser further including a plurality $n$ of numbered surfaces, each numbered by a distinct integer $i$, and $i$ ranging serially from $l$ to $n$, on which said contratraveling primary light waves impinge, said surfaces so formed and mounted within said channel such that the application of a sinusoidal signal to said surfaces causes said surfaces to oscillate in a shear mode parallel to said laser plane, each of said surfaces having imperfections which cause fractions of the radiation of each of said primary light waves incident on said surfaces to be backscattered into the path of the other of said primary light waves, said fractions of backscattered radiation being mutually reinforcing in the same direction, thereby producing within said channel two contratraveling induced light waves, each of which acts to change the frequency of said primary light wave traveling in its direction, causing mode coupling between said primary waves, said method comprising the steps of:

(a) oscillating the $i$th of said surfaces at a frequency $f_{mi}$, thereby distributing the energy of said two contratraveling induced waves among a plurality of secondary induced waves in both directions, each of said secondary induced waves differing in optical frequency from the next adjacent secondary induced wave by an optical frequency corresponding to said frequency $f_{mi}$, thereby reducing, in direct proportion to the value of said $f_{mi}$, the influence of said induced waves on said optical frequency of said contratraveling primary waves;

(b) oscillating the $i$th of said surfaces at an amplitude $A_{mi}$, said $A_{mi}$ being specified such as to cause, in each direction, the optical frequency of the nearest of said secondary induced waves to said corresponding primary wave to differ from that of said corresponding primary wave by an optical frequency corresponding to a minimum of $2f_{mi}$; and (c) oscillating the $i$th of said surfaces at a phase angle $\theta_{mi}$ relative to a reference phase $\psi$, said angle $\theta_{mi}$ being so specified as to minimize said mutual reinforcement to said fractions of backscattered radiation.

15. The method of claim 14 wherein said frequency $f_{mi}$ is as large as possible consistent with design goals.

16. The method of claim 15 wherein said $f_{mi}$ is substantially the resonant frequency of each of said surfaces.

17. The method of claim 14 wherein said amplitude $A_{mi}$ is specified by the equation $$A_{mi} = \beta\lambda/.4\pi (\sin \alpha_i)$$

wherein $\alpha_i$ is the angle of incidence of the primary waves at the $i$th of said surfaces, $\lambda$ is the wavelength of said primary waves, and $\beta$ is any number which, taken as the argument of the Bessel function of zero order, yields a value of the Bessel function that is zero.

18. The method of claim 14 wherein said phase angle $\theta_{mi}$ is specified by the relationship $$\theta_{mi} = 2\pi l_{mi}/l$$

where $l_{mi}$ is the relative position of the $i$th of said surfaces along said path of said laser, and $l$ is the total length of said laser's path.

References Cited

UNITED STATES PATENTS 3,469,922  9/1969  Coccoli et al.

RONALD L. WIBERT, Primary Examiner

V. P. McGRAW, Assistant Examiner

U.S. Cl. X.R.

356—106